A. GUNSALLUS.
SPRING WHEEL.
APPLICATION FILED OCT. 10, 1919.
1,370,435. Patented Mar. 1, 1921.
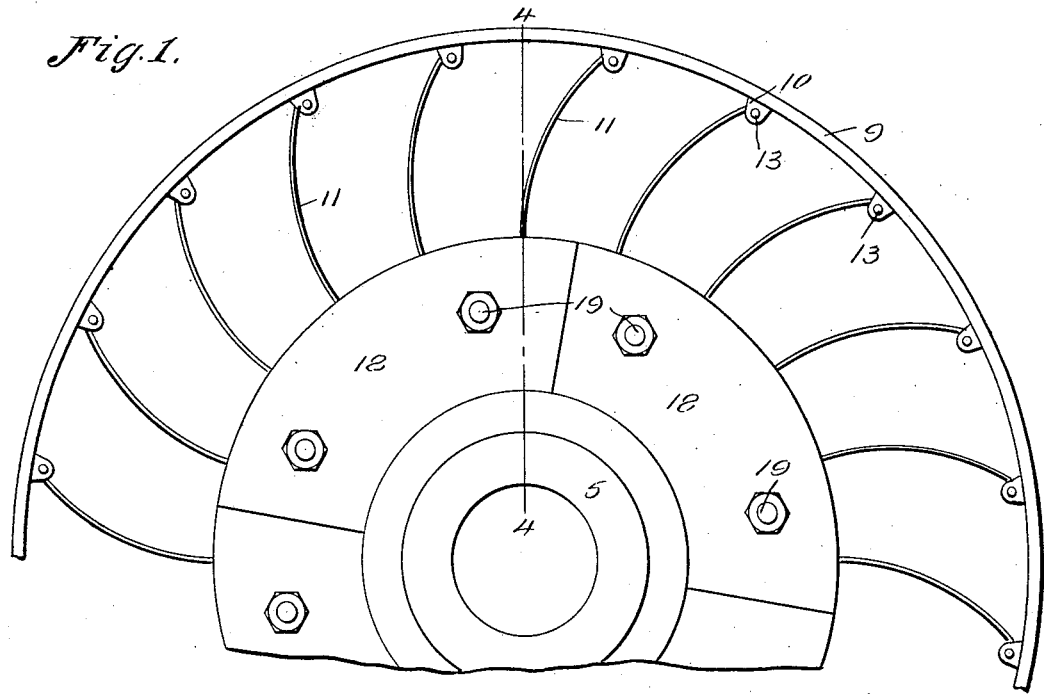
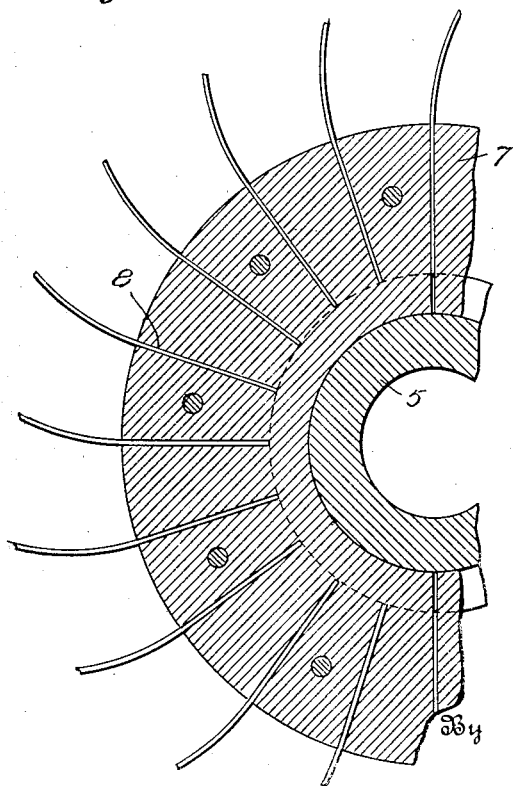
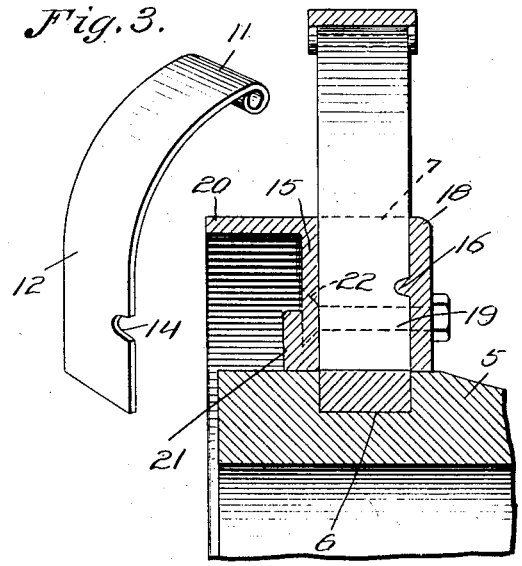
Inventor
Arthur Gunsallus.
Geo. F. Kimmel
Attorney

UNITED STATES PATENT OFFICE.

ARTHUR GUNSALLUS, OF TYRONE, PENNSYLVANIA.

SPRING-WHEEL.

1,370,435. Specification of Letters Patent. Patented Mar. 1, 1921

Application filed October 10, 1919. Serial No. 329,771.

*To all whom it may concern:*

Be it known that I, ARTHUR GUNSALLUS, a citizen of the United States, residing at Tyrone, in the county of Blair and State of Pennsylvania, have invented certain new and useful Improvements in Spring-Wheels, of which the following is a specification.

The invention relates to a wheel construction, and more particularly to the class of spring wheels.

The primary object of the invention is the provision of a wheel of this character, wherein the hub thereof is of novel construction to permit the detachable fastening of the spring spokes therein, whereby on damage or breakage to any of the same it is possible to make repairs without requiring the tearing down of the entire wheel structure, and at the same time avoiding the necessity of skilled labor for this purpose.

Another object of the invention is the provision of a wheel of this character, wherein the same will be possessed of maximum resilient qualities and will withstand variable loads, the wheel in its entirety being of novel construction to assure durability and efficiency in the use thereof.

A further object of the invention is the provision of a wheel of this character, which is comparatively simple in construction, thoroughly reliable and efficient in its purpose, and inexpensive to manufacture.

Other objects will be in part obvious and in part hereinafter pointed out.

The invention accordingly consists in the features of construction and combination of elements, the construction of which will be exemplified in the following detail description, and the scope of application of which will be indicated in the claim hereunto appended.

In the accompanying drawing:

Figure 1 is a fragmentary side elevation of a wheel constructed in accordance with the invention.

Fig. 2 is a fragmentary, vertical, sectional view therethrough.

Fig. 3 is a fragmentary perspective view of one of the spring spokes removed.

Fig. 4 is a sectional view on the line 4—4 of Fig. 1.

Similar reference characters indicate corresponding parts throughout the several views in the drawing.

Referring to the drawing in detail, the wheel construction comprises a hub 5 preferably of the formation shown, having intermediate its ends an annular groove 6, in which is engaged the split two part circular plate or disk 7, each part being in the form of a segment and is provided with radial slots or slits 8, which open through the outer periphery of the disk 7 but do not extend through the inner periphery thereof, said slots or slits terminating outwardly of said inner periphery.

Concentric to the circular plate or disk 7, is a felly or rim 9, which has provided at intervals on the inner periphery thereof, spaced pivot ears 10, between which are arranged the pivot receiving ends 11 of curvilinear spring spokes 12, the curvature thereof being at the outer end portion, while the inner end portions are straight and engaged in these pivot ends 11 are transverse pivots or bolts 13, which are engaged in the ears 10 and detachably fastened therein in any suitable manner. The straight inner end portions of the spoke 12 are engaged in the slots or slits 8 in the disk 7, these inner straight portions being formed, each in one edge with a notch 14 for permitting the securing of the spokes in a manner presently described.

Arranged concentric of the hub 5 and against the inner face of the disk 7 is an inner circular plate or disk 15.

Arranged concentrically upon the hub 5 against the outer face of the disk 7 is a plurality of outside sector plates 18 which when grouped correspond to the shape of the disk 7 and passing transversely through these plates 18, the two parts of the disk 7 and the inside plate or disk 15 are fasteners 19 which permit the removal of said outside plates 18 for the detaching of one or any number of spokes 12 from the hub. The outside plates 18 have formed on their inner faces head sections 16, to engage in the notches, 14 on the spokes to fasten the same in the disk 7.

Formed on or secured to the inside disk or plate 15 at its periphery is a brake flange 20 which is adapted to coöperate with brake band in the usual well known manner.

The inside disk or plate 15 has thereon an annular reinforcement 21 contiguous to and circumferentially of the hub 5 to strengthen said inside disk or plate as will be apparent.

The fasteners 19, which are preferably in the form of bolts, have their heads 22, counterseated within the inside disk or plate 15 so as to be flush with the outer surface thereof.

It will be clearly apparent that to remove one or any number of spokes 12, certain of the outside plates 18 must be detached by disengaging the fasteners 19 and on such detachment the spoke 12 can be withdrawn from the slots or slits 8 in the disk 7. Now should it be desired to remove the hub 5 it is necessary to detach all of the plates 18, whereupon the two parts of the disk 7 can be disengaged from the groove 6 in the hub, it being understood that these parts are disengaged from the fasteners, 19 which latter are slipped out of the disk 15 at the inner side thereof.

When the wheel is assembled and set up as a unit it possesses the required strength to withstand loads, yet it has the maximum resiliency, thereby eliminating the necessity for the use of pneumatic or cushion tires, although if desired these tires can be employed with the wheel.

From the foregoing it is thought that the construction, manner of assembling and operation of the wheel will be clearly understood and therefore a more extended explanation has been omitted.

What is claimed is:

A spring wheel construction comprising a hub having an annular groove intermediate its ends, a radially slotted disk seated in said groove, an inner disk surrounding the hub against the radially slotted disk, a plurality of curved spokes for said radial slots extending considerably outward therefrom, a tired felly concentrically about the hub and connected to the outer ends of the spokes, a sectional outer disk disposed about the hub against the outer face of the said slotted disk, means for locking the spokes and sectional outer disks and fasteners crossing transversely through the disk.

In testimony whereof, I affix my signature hereto.

ARTHUR GUNSALLUS.